(12) United States Patent
McMillen et al.

(10) Patent No.: US 7,775,595 B2
(45) Date of Patent: Aug. 17, 2010

(54) DRIVE MECHANISM

(75) Inventors: Robert J. McMillen, Tecumseh (CA); Robert Kopetzky, Lauf (DE); Joseph Benson, South Lyon, MI (US); Hans Kogel, Windsor (CA); Horia Blendea, LaSalle (CA)

(73) Assignee: Schukra of North America, Lakeshore-Tecumseh, Ontario (CA)

( * ) Notice: Subject to any disclaimer, the term of this patent is extended or adjusted under 35 U.S.C. 154(b) by 756 days.

(21) Appl. No.: 10/587,439

(22) PCT Filed: Jan. 25, 2005

(86) PCT No.: PCT/US2005/002298

§ 371 (c)(1),
(2), (4) Date: May 22, 2007

(87) PCT Pub. No.: WO2005/078312

PCT Pub. Date: Aug. 25, 2005

(65) Prior Publication Data

US 2007/0236039 A1    Oct. 11, 2007

Related U.S. Application Data

(60) Provisional application No. 60/542,343, filed on Feb. 6, 2004.

(51) Int. Cl.
*B60N 2/02*   (2006.01)
*F16M 13/00*  (2006.01)
(52) U.S. Cl. .................. 297/362.11; 248/424

(58) Field of Classification Search ............ 297/362.11; 296/65.15; 248/424, 428, 419, 422; 475/149, 475/337
See application file for complete search history.

(56) References Cited

U.S. PATENT DOCUMENTS

| 1,182,854 | A | 5/1916 | Poler |
| 1,203,293 | A | 10/1916 | Wilkinson |
| 2,274,176 | A | 2/1942 | Widman |
| 2,756,809 | A | 7/1956 | Endresen |

(Continued)

FOREIGN PATENT DOCUMENTS

AT            401497         9/1996

(Continued)

OTHER PUBLICATIONS

International Search Report for PCT/US2005/002298.

*Primary Examiner*—Sarah B McPartlin
(74) *Attorney, Agent, or Firm*—Grant D. Kang; Kang Intellectual Property Law, LLC

(57) ABSTRACT

A hollow axle motor assembly (10) includes an armature (13) and a hollow axle (12) attached to the armature (13). The hollow axle (12) has an outer diameter (14) and an inner diameter (16). The inner diameter (16) of the hollow axle (12) receives a shaft or tube, such as a drive shaft (52). A gear (20) is attached to the outer diameter (14) of the hollow axle (12). The gear (20) is in driving communication with a planetary gear drive assembly (30). In turn, the planetary gear drive assembly (30) is in driving communication with a drive shaft mount (40). The drive shaft mount (40) can be used to drive any number of conventional items, including, for example, the drive shaft (52).

5 Claims, 6 Drawing Sheets

U.S. PATENT DOCUMENTS

| | | |
|---|---|---|
| 2,833,339 A | 5/1958 | Lilijengren |
| 2,843,195 A | 7/1958 | Barvaeus |
| 2,855,984 A | 10/1958 | Majorana et al. |
| 2,942,651 A | 6/1960 | Binding |
| 3,121,585 A | 2/1964 | Krueger et al. |
| 3,146,839 A | 9/1964 | Carlson |
| 3,202,453 A | 8/1965 | Richards |
| 3,241,879 A | 3/1966 | Castello et al. |
| 3,246,924 A | 4/1966 | Krueger et al. |
| 3,271,076 A | 9/1966 | Smith |
| 3,273,877 A | 9/1966 | Geller et al. |
| 3,363,941 A | 1/1968 | Wierwille |
| 3,378,299 A | 4/1968 | Sandor |
| 3,490,084 A | 1/1970 | Schuster |
| 3,492,768 A | 2/1970 | Schuster |
| 3,550,953 A | 12/1970 | Neale |
| 3,695,688 A | 10/1972 | Wize |
| 3,724,144 A | 4/1973 | Schuster |
| 3,762,769 A | 10/1973 | Poschl |
| 3,927,911 A | 12/1975 | Rosquist |
| 3,929,374 A | 12/1975 | Hogan et al. |
| 3,938,858 A | 2/1976 | Drabert et al. |
| 3,967,852 A | 7/1976 | Eiselt et al. |
| 3,983,640 A | 10/1976 | Cardullo et al. |
| 3,992,059 A | 11/1976 | Kloepfer |
| 4,040,661 A | 8/1977 | Hogan et al. |
| 4,050,331 A | 9/1977 | Braren et al. |
| 4,105,245 A | 8/1978 | Simons et al. |
| 4,136,577 A | 1/1979 | Borgersen |
| 4,153,293 A | 5/1979 | Sheldon |
| 4,155,592 A | 5/1979 | Tsuda et al. |
| 4,156,544 A | 5/1979 | Swenson et al. |
| 4,182,533 A | 1/1980 | Arndt et al. |
| 4,190,286 A | 2/1980 | Bentley |
| 4,295,681 A | 10/1981 | Gregory |
| 4,313,637 A | 2/1982 | Barley |
| 4,316,631 A | 2/1982 | Lenz et al. |
| 4,354,709 A | 10/1982 | Schuster |
| 4,368,916 A | 1/1983 | Blasin |
| 4,390,210 A | 6/1983 | Wisniewski et al. |
| 4,428,611 A | 1/1984 | Widmer |
| 4,449,751 A | 5/1984 | Murphy et al. |
| 4,452,485 A | 6/1984 | Schuster |
| 4,465,317 A | 8/1984 | Schwarz |
| 4,519,646 A | 5/1985 | Leitermann et al. |
| 4,541,670 A | 9/1985 | Morgenstern et al. |
| 4,555,140 A | 11/1985 | Nemoto |
| 4,556,251 A | 12/1985 | Takagi |
| 4,564,235 A | 1/1986 | Hatsutta et al. |
| 4,565,406 A | 1/1986 | Suzuki |
| 4,576,410 A | 3/1986 | Hattori |
| 4,601,514 A | 7/1986 | Meiller |
| 4,602,819 A | 7/1986 | Morel |
| 4,616,874 A | 10/1986 | Pietsch et al. |
| 4,619,481 A | 10/1986 | Grudzinskas |
| 4,627,661 A | 12/1986 | Ronnhult et al. |
| 4,630,865 A | 12/1986 | Ahs |
| 4,632,454 A | 12/1986 | Naert |
| 4,634,083 A | 1/1987 | McKinnon |
| 4,655,505 A | 4/1987 | Kashiwamura et al. |
| 4,676,550 A | 6/1987 | Neve De Mevergnies |
| 4,679,848 A | 7/1987 | Spierings |
| 4,699,418 A | 10/1987 | Plavetich |
| 4,707,027 A | 11/1987 | Horvath et al. |
| 4,711,490 A | 12/1987 | Brand |
| 4,730,871 A | 3/1988 | Sheldon |
| 4,768,830 A | 9/1988 | Musselwhite |
| 4,826,249 A | 5/1989 | Bradbury |
| 4,833,614 A | 5/1989 | Saitoh et al. |
| 4,834,455 A | 5/1989 | Proctor |
| 4,880,271 A | 11/1989 | Graves |
| 4,909,568 A | 3/1990 | Dal Monte |
| 4,915,448 A | 4/1990 | Morgenstern |
| 4,918,344 A | 4/1990 | Chikamori et al. |
| 4,950,032 A | 8/1990 | Nagasaka |
| 4,957,102 A | 9/1990 | Tan et al. |
| 4,968,093 A | 11/1990 | Dal Monte |
| 4,976,104 A | 12/1990 | Morris et al. |
| 5,005,904 A | 4/1991 | Clemens et al. |
| 5,022,709 A | 6/1991 | Marchino |
| 5,026,116 A | 6/1991 | Dal Monte |
| 5,050,930 A | 9/1991 | Schuster et al. |
| 5,076,643 A | 12/1991 | Colasanti et al. |
| 5,082,326 A | 1/1992 | Sekido et al. |
| 5,088,790 A | 2/1992 | Wainwright et al. |
| 5,092,654 A | 3/1992 | Inaba et al. |
| 5,120,111 A | 6/1992 | Cook |
| 5,137,329 A | 8/1992 | Neale |
| 5,174,526 A | 12/1992 | Kanigowski |
| 5,195,795 A | 3/1993 | Cannera et al. |
| 5,197,780 A | 3/1993 | Coughlin |
| 5,215,350 A | 6/1993 | Kato |
| 5,217,278 A | 6/1993 | Harrison et al. |
| 5,269,581 A | 12/1993 | Odagaki et al. |
| 5,286,087 A | 2/1994 | Elton |
| 5,292,175 A | 3/1994 | Artz |
| 5,292,176 A | 3/1994 | Artz |
| 5,299,851 A | 4/1994 | Lin |
| 5,316,371 A | 5/1994 | Bishai |
| 5,323,998 A * | 6/1994 | Aihara .................. 248/430 |
| 5,335,965 A | 8/1994 | Sessini |
| 5,368,355 A | 11/1994 | Hayden et al. |
| 5,385,389 A | 1/1995 | Bishai |
| 5,385,531 A | 1/1995 | Jover |
| 5,397,164 A | 3/1995 | Schuster |
| 5,397,167 A | 3/1995 | Fourrey et al. |
| 5,423,593 A | 6/1995 | Nagashima |
| 5,429,558 A | 7/1995 | Lagarde |
| 5,449,219 A | 9/1995 | Hay et al. |
| 5,452,868 A | 9/1995 | Kanigowski |
| 5,472,261 A | 12/1995 | Oplenskdal et al. |
| 5,474,358 A | 12/1995 | Maeyaert |
| 5,482,346 A | 1/1996 | Lesourd |
| 5,498,063 A | 3/1996 | Schuster et al. |
| 5,518,294 A | 5/1996 | Ligon, Sr. et al. |
| 5,529,377 A | 6/1996 | Miller |
| 5,542,744 A * | 8/1996 | Bathrick .............. 297/362.11 |
| 5,553,917 A | 9/1996 | Adat et al. |
| 5,562,324 A | 10/1996 | Massara et al. |
| 5,567,010 A | 10/1996 | Sparks |
| 5,567,011 A | 10/1996 | Sessini |
| 5,570,931 A | 11/1996 | Kargilis et al. |
| 5,588,703 A | 12/1996 | Itou |
| 5,588,707 A | 12/1996 | Bolsworth et al. |
| 5,609,394 A | 3/1997 | Ligon, Sr. et al. |
| 5,626,390 A | 5/1997 | Schuster et al. |
| 5,638,722 A | 6/1997 | Klingler |
| 5,651,583 A | 7/1997 | Klingler et al. |
| 5,651,584 A | 7/1997 | Chenot et al. |
| 5,660,438 A | 8/1997 | Tedesco |
| 5,681,079 A | 10/1997 | Robinson |
| 5,702,155 A * | 12/1997 | Ito .................. 297/362.11 |
| 5,704,687 A | 1/1998 | Klingler |
| 5,718,476 A | 2/1998 | De Pascal et al. |
| 5,730,495 A | 3/1998 | Tuman, II |
| 5,758,925 A | 6/1998 | Schrewe et al. |
| 5,762,397 A | 6/1998 | Venuto et al. |
| 5,769,491 A | 6/1998 | Schwarzbich |
| 5,772,281 A | 6/1998 | Massara |
| 5,775,773 A | 7/1998 | Schuster et al. |
| 5,791,733 A | 8/1998 | Van Hekken et al. |
| 5,816,653 A | 10/1998 | Benson |
| 5,823,620 A | 10/1998 | Le Caz |
| 5,857,743 A | 1/1999 | Ligon, Sr. et al. |

| | | |
|---|---|---|
| 5,868,466 A | 2/1999 | Massara |
| 5,884,968 A | 3/1999 | Massara |
| 5,897,168 A | 4/1999 | Bartelt et al. |
| 5,911,477 A | 6/1999 | Mundell et al. |
| 5,913,569 A | 6/1999 | Klingler |
| 5,934,752 A | 8/1999 | Klingler |
| 5,941,602 A | 8/1999 | Sturt et al. |
| 5,967,608 A | 10/1999 | Van Sickle |
| 5,975,632 A | 11/1999 | Ginat |
| 5,984,407 A | 11/1999 | Ligon, Sr. et al. |
| 5,988,745 A | 11/1999 | Deceuninck |
| 6,003,941 A | 12/1999 | Schuster, Sr. et al. |
| 6,007,151 A | 12/1999 | Benson |
| 6,030,041 A | 2/2000 | Hsiao |
| 6,036,265 A | 3/2000 | Cosentino |
| 6,045,185 A | 4/2000 | Ligon, Sr. et al. |
| 6,050,641 A | 4/2000 | Benson |
| 6,079,783 A | 6/2000 | Schuster, Sr. et al. |
| 6,092,871 A | 7/2000 | Beaulieu |
| 6,152,531 A | 11/2000 | Deceuninck |
| 6,152,532 A | 11/2000 | Cosentino |
| 6,158,300 A | 12/2000 | Klingler |
| 6,174,017 B1 | 1/2001 | Salani et al. |
| 6,199,951 B1 | 3/2001 | Zeile et al. |
| 6,227,617 B1 | 5/2001 | Von Möller |
| 6,227,618 B1 | 5/2001 | Ligon, Sr. et al. |
| 6,254,186 B1 | 7/2001 | Falzon |
| 6,254,187 B1 | 7/2001 | Schuster, Sr. et al. |
| 6,270,158 B1 | 8/2001 | Hong |
| 6,296,308 B1 | 10/2001 | Cosentino et al. |
| 6,322,146 B1 * | 11/2001 | Fisher, Jr. ............... 297/362.14 |
| 6,331,034 B1 * | 12/2001 | Specht .................. 297/362.11 |
| 6,334,651 B1 | 1/2002 | Duan et al. |
| 6,371,558 B1 | 4/2002 | Couasnon |
| 6,375,255 B1 | 4/2002 | Maruta et al. |
| 6,554,360 B1 | 4/2003 | Wilke et al. |
| 6,648,395 B2 | 11/2003 | Hoshino |
| 6,655,738 B2 | 12/2003 | Kämmerer |
| 6,669,299 B2 | 12/2003 | Carlson et al. |
| 6,695,402 B2 | 2/2004 | Sloan, Jr. |
| 6,736,459 B1 | 5/2004 | Sturt |
| 6,860,561 B2 | 3/2005 | Takata |
| 7,000,986 B2 | 2/2006 | Cruz Fernandes de Pinho |
| 7,073,764 B2 * | 7/2006 | Matsushiro ................ 248/424 |
| 7,118,178 B2 * | 10/2006 | Daniels .................. 297/378.1 |
| 7,140,680 B2 | 11/2006 | McMillen et al. |
| 2003/0085600 A1 | 5/2003 | Mori |

FOREIGN PATENT DOCUMENTS

| | | |
|---|---|---|
| DE | 2040794 | 7/1971 |
| DE | 2064419 | 7/1972 |
| DE | 2947472 | 8/1980 |
| DE | 4220995 A1 | 1/1994 |
| DE | 44 12 898 A1 | 10/1995 |
| DE | 4412898 A1 | 10/1995 |
| DE | 19750116 A1 | 5/1999 |
| DE | 299 05 163 U1 | 7/1999 |
| DE | 29905163 U1 | 7/1999 |
| DE | 10005215 C1 | 9/2001 |
| DE | 103 14 771 A1 | 10/2004 |
| DE | 10314771 A1 | 10/2004 |
| EP | 0006840 B1 | 2/1982 |
| EP | 0169293 B1 | 10/1988 |
| EP | 0322535 A1 | 7/1989 |
| EP | 0518830 A1 | 12/1992 |
| EP | 0485483 B1 | 1/1994 |
| EP | 0434660 B1 | 5/1995 |
| EP | 0540481 B1 | 12/1995 |
| EP | 0662795 B1 | 12/1996 |
| EP | 0702522 B1 | 3/1997 |
| EP | 0696251 B1 | 7/1997 |
| EP | 0746219 B1 | 11/1998 |
| EP | 0797399 B1 | 11/1998 |
| EP | 0698360 B1 | 3/2000 |
| FR | 2596334 | 10/1987 |
| GB | 1423617 | 2/1976 |
| GB | 2013487 | 2/1978 |
| SU | 587924 | 2/1978 |
| WO | WO/00/00064 | 1/2000 |
| WO | WO 01/48397 | 7/2001 |
| WO | WO03/022626 A1 | 3/2003 |
| WO | WO2004/043207 A2 | 5/2004 |
| WO | WO2004/043730 A2 | 5/2004 |

* cited by examiner

DRIVE MECHANISM

CROSS-REFERENCE TO RELATED APPLICATIONS

This application claims priority of U.S. Provisional Application No. 60/542,343 filed on Feb. 6, 2004.

BACKGROUND OF THE INVENTION

1. Field of the Invention

This invention relates generally to drive mechanisms and, more particularly, to a hollow axle motor assembly.

2. Related Art

Electric motor drive arrangements for seat movement and ergonomic support movement are known. Typically, the motor has a shaft and a gear drive arrangement is attached to the shaft. In the known devices, output from the motor/gear drive arrangement has only been available on one end of the motor. For some time, there has been a need for a dual output motor and planetary gear drive arrangement. Such a device could provide a compact and cost-effective package to drive any number of seat mechanisms. There remains a need in the art for a compact and cost-effective combination motor and gear drive arrangement having dual output.

Seat track assemblies are known. Some seat track assemblies may incorporate a drive mechanism and a locking mechanism. These devices are somewhat complex. For example, a first actuator connected to the drive mechanism and a second actuator connected to the locking mechanism may be required. The first and second actuators must be coordinated such that the locking mechanism is "unlocked" prior to engagement of the drive mechanism. This often involves a complex, inefficient, and expensive arrangement of stops and limit switches. While the separate locking mechanism contributes to crash worthiness of the seat track assembly, the complex arrangement of the stops and limit switches significantly adds to the cost of the seat track assembly. Moreover, having two separate actuators significantly adds to the weight of the seat track assembly.

Thus, there remains a need in the art for a seat track assembly having a single actuator disposed to operate separate drive and locking mechanisms. There also remains the continuing need for a seat track assembly that is light weight, compact in size, cost effective, and crash worthy.

Additionally, a combination motor and planetary gear arrangement is disclosed in U.S. Pat. No. 4,986,514 issued to Ikegaya et al. Ikegaya uses a planetary gear drive to adjust inclination of a seat back. The '514 patent discloses placing the motor assembly adjacent the seat back and connecting the planetary gear arrangement to the seat back. This results in a bulky package.

Thus, there remains a need for a compact and cost-effective reclining mechanism.

SUMMARY OF THE INVENTION

It is in view of the above problems that the present invention was developed. The invention is a hollow axle motor assembly. The hollow axle motor assembly includes an armature and a hollow axle attached to the armature. The hollow axle has an outer diameter and an inner diameter. The inner diameter of the hollow axle receives a shaft or tube, such as a drive shaft. A gear is attached to the outer diameter of the hollow axle. The gear is in driving communication with a gear drive assembly, such as planetary gear assembly. In turn, the planetary gear drive assembly is in driving communication with a drive shaft mount. The drive shaft mount can be used to drive any number of conventional items, including, for example, a drive shaft. Advantageously, the driven member, such as a drive shaft, can be coaxial with the motor and disposed within the hollow axle such that the motor and gear drive assembly has a dual output. That is, the drive shaft extends from both ends of the motor.

In a first example, the hollow axle motor assembly is used to drive a track drive mechanism. In this first example, there is a seat track assembly. The seat track assembly includes a seat track, a track drive mechanism, and a locking mechanism. When the track drive mechanism is activated, the hollow axle motor assembly operates a lever to disengage the locking mechanism prior to adjustment of the seat track position. After the seat track position has been adjusted, the track drive mechanism is disengaged and, thereafter, the hollow axle motor assembly operates the lever to re-engage the locking mechanism.

In a second example, the hollow axle motor assembly forms part of the seat hinge. In other words, the hollow axle motor assembly is coaxial with the seat hinge. In this manner, the hollow axle motor assembly can be engaged to adjust the inclination of the seat back. This provides a compact arrangement for electrically adjusting the inclination of the seat back.

Thus, in furtherance of the above goals and advantages, the invention is, briefly, a hollow axle motor assembly having a drive shaft, an electric motor with a hollow axle, the hollow axle having an outer diameter and an inner diameter, the hollow axle adapted to receive the drive shaft within the inner diameter, a first gear operatively connected to the hollow axle, a planetary gear drive assembly in driven communication with the first gear, and a drive shaft mount in driven communication with the planetary gear drive assembly and in driving communication with the drive shaft, wherein the hollow axle rotates the first gear, the first gear engages the planetary gear drive assembly, the planetary gear drive assembly rotates the drive shaft mount, and the drive shaft mount rotates the drive shaft within the hollow axle.

Further, the invention is, briefly, a track drive mechanism having a first track, a second track offset from the first track, a first locking mechanism adapted to engage the first track, a second locking mechanism adapted to engage the second track, a latch release shaft operatively connected to the first locking mechanism and to the second locking mechanism, a latch bar operatively connected to the latch release shaft, a hollow axle motor assembly having a hollow axle and a housing, a track drive shaft operatively connected to the hollow axle, the track drive shaft having an upper portion and a lower portion, a first gear adapted to engage the first track and operatively connected to the upper portion of the track drive shaft, a second gear adapted to engage the second track and operatively connected to the lower portion of the track drive shaft, and a cam operatively connected to the housing, the cam adapted to engage the latch bar such that, upon engagement of the hollow axle motor assembly and rotation of the cam, the latch bar rotates the latch release shaft thereby releasing the first locking mechanism and the second locking mechanism.

Further, the invention is, briefly, a seat having a seat bottom, a seat back hingedly connected to the seat bottom, and a hollow axle motor assembly coaxial with the hinge connection, the hollow axle motor assembly including: a shaft, an electric motor having a hollow axle, the hollow axle having an outer diameter and an inner diameter, the hollow axle adapted to receive the shaft within the inner diameter, a housing connected to the electric motor, a first gear operatively connected to the hollow axle, a planetary gear drive assembly in driven communication with the first gear, and a drive shaft mount in driven communication with the planetary gear drive assembly and in driving communication with the shaft, wherein the hollow axle rotates the first gear, the first gear engages the planetary gear drive assembly, the planetary gear drive assembly rotates the drive shaft mount, and the drive shaft mount rotates the shaft within the hollow axle, and wherein the shaft is rigidly connected to the seat bottom, the housing is rigidly connected to the seat back, whereby engagement of the electric motor moves the seat back relative to the seat bottom.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
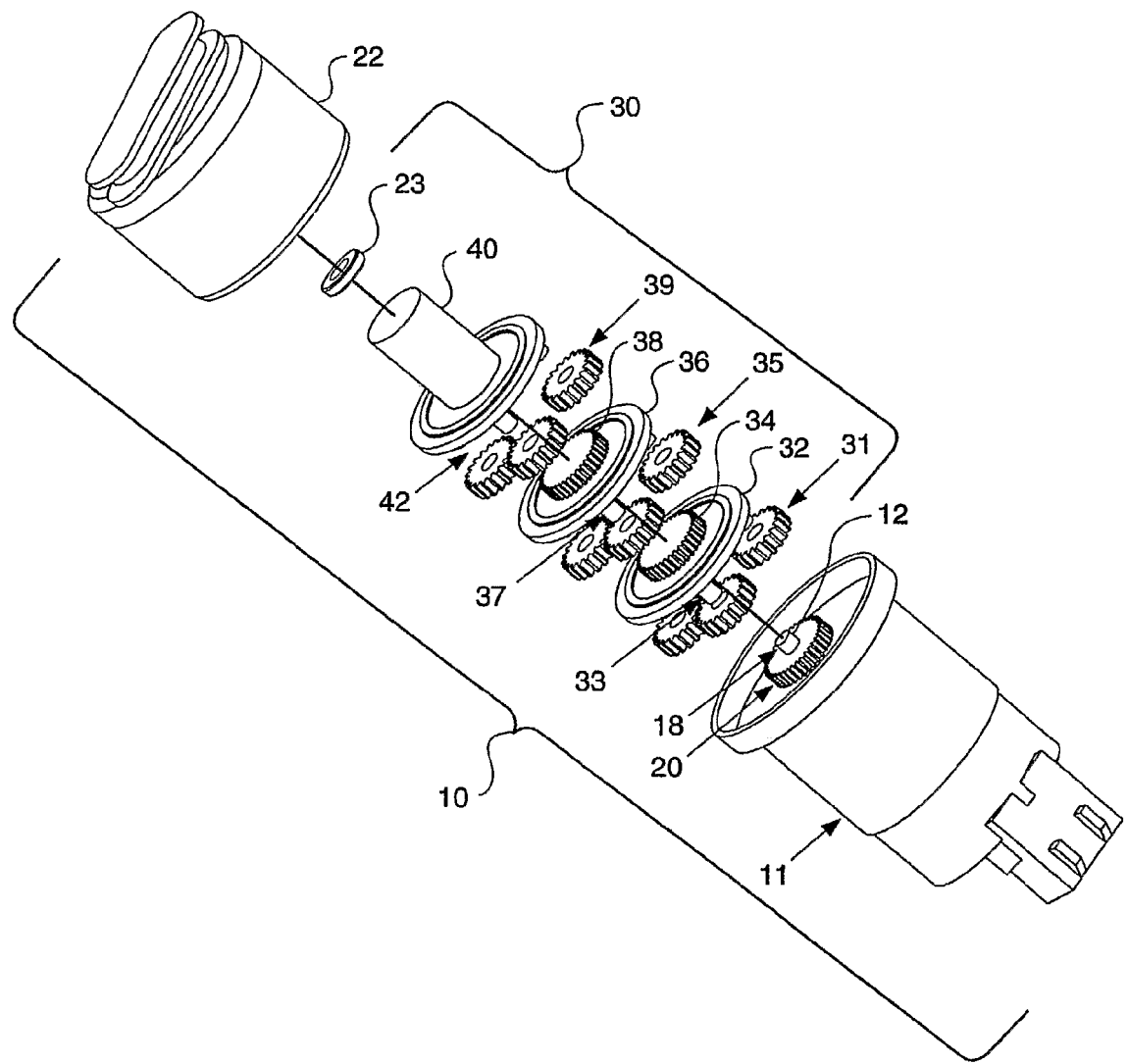
FIG. 1 is an exploded view of a hollow axle motor assembly.
Figure 2:
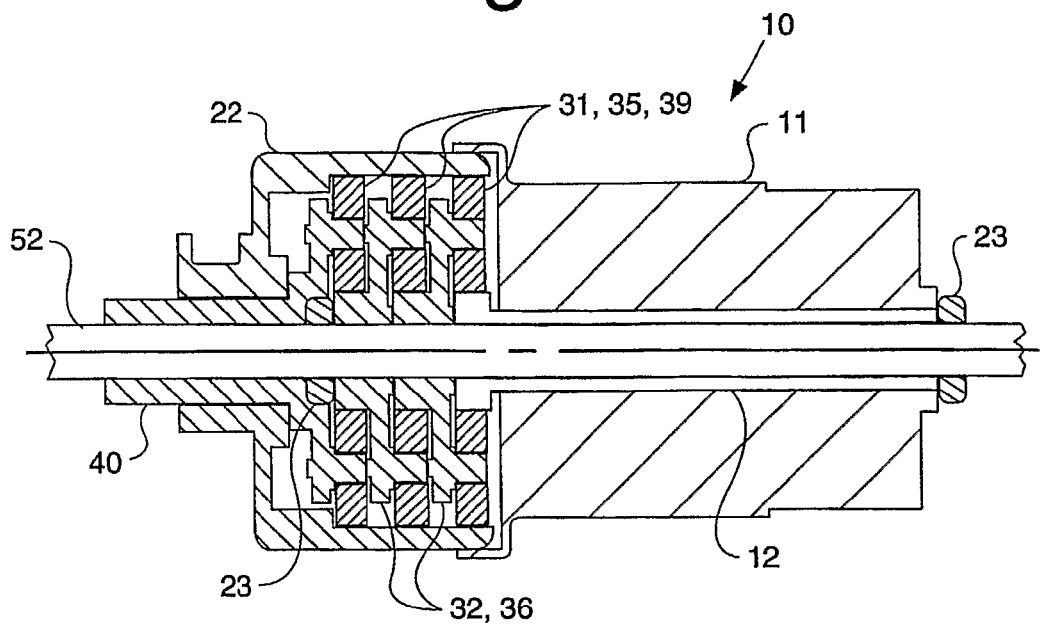
FIG. 2 is a sectional top view of the hollow axle motor assembly.
Figure 3:
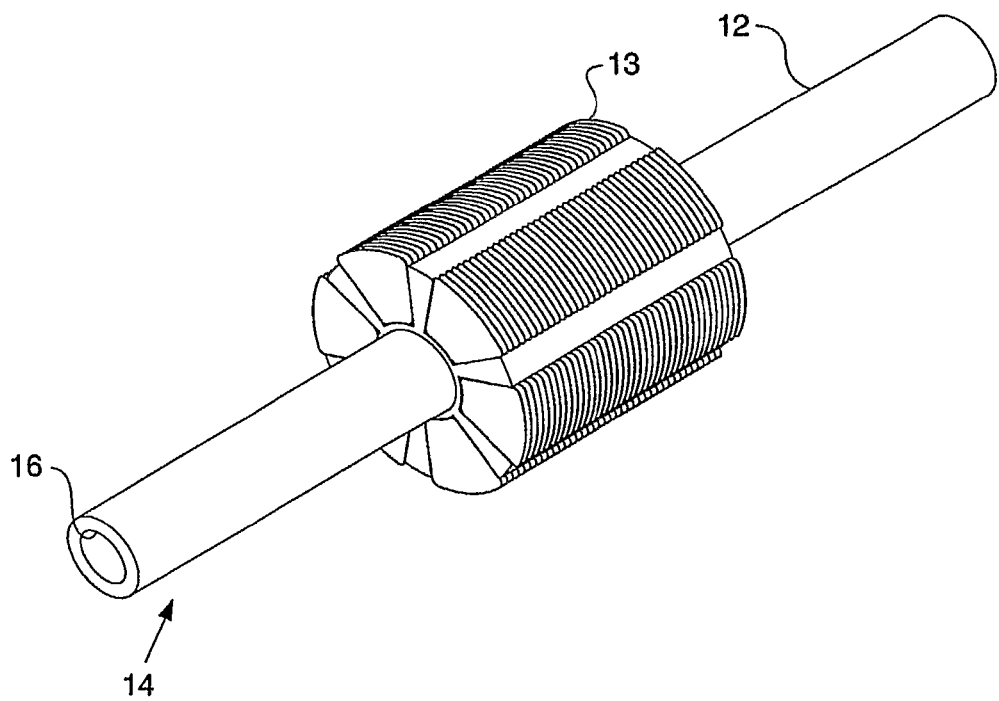
FIG. 3 is a perspective view of the hollow axle.

Referring to the accompanying drawings in which like reference numbers indicate like elements, FIGS. 1 and 2 illustrate a hollow axle motor assembly 10. The hollow axle motor assembly 10 includes a motor 11. The motor 11 includes a hollow axle 12. As best seen in FIG. 3, the hollow axle 12 is connected to an armature 13 of the motor 11. The hollow axle 12 includes an outer diameter 14 and an inner diameter 16. Returning once again to FIG. 1, a first gear 20 is connected to the hollow axle 12. In the depicted embodiment, the first gear 20 is connected to an end portion 18 of the hollow axle 12, and the first gear 20 is the sun gear of a planetary gear set. While in the depicted embodiments a planetary gear set is shown, it is within the scope of the present invention that other types of gear sets may be used to engage the hollow axle 12.

The first gear 20 is in driving communication with a planetary gear drive assembly 30. In the depicted embodiment, the planetary gear drive assembly 30 is a 3-stage planetary gear drive having a total gear drive ratio of 500:1. However, those skilled in the art will understand that any number of gear stages with a larger or smaller ratio may be used. A planetary drive cover 22 covers the planetary gear drive assembly 30 and is connected to the motor 11. The planetary drive cover 22 is also referred to as a housing. The planetary gear drive assembly 30 is in driving communication with a drive shaft mount 40.

In the embodiment depicted in FIG. 1, first planetary gears 31 revolve around and are rotated by the first gear 20. A first drive disk 32 has first drive disk axles 33. The first planetary gears 31 rotate the first drive disk axles 33, thereby rotating the first drive disk 32. A second gear 34 is connected to the first drive disk 32 and, therefore, rotates with the first drive disk 32. Second planetary gears 35 revolve around and are rotated by the second gear 34. A second drive disk 36 has second drive disk axles 37. The second planetary gears 35 rotate the second drive disk axles 37, thereby rotating the second drive disk 36. A third gear 38 is connected to the second drive disk 36 and, therefore, rotates with the second drive disk 36. Third planetary gears 39 revolve around and are rotated by the third gear 38. The drive shaft mount 40 has third drive axles 42. The third planetary gears 39 rotate the third drive axles 42, thereby rotating the drive shaft mount 40.

As best seen in FIG. 2, some embodiments may include any number of antifriction components 23 to reduce friction of rotating components. As an example, the antifriction component 23 may be a bearing.

Figure 4:
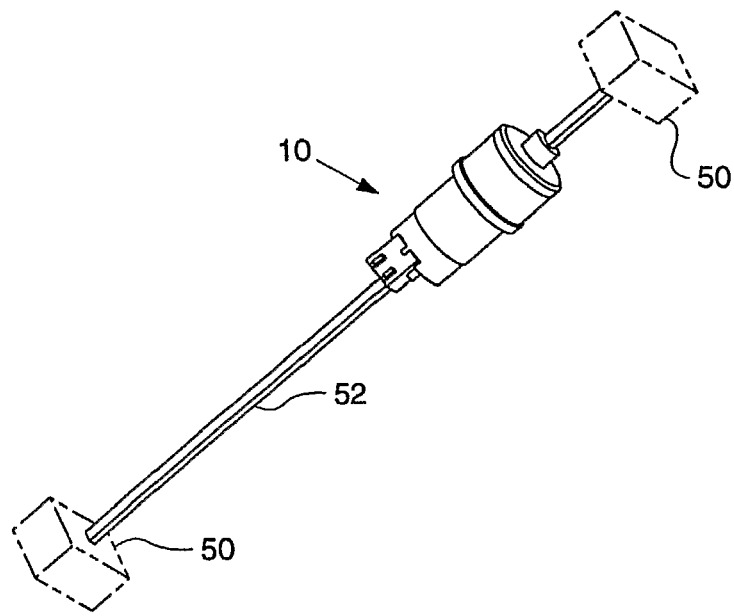
FIG. 4 is a perspective view of a hollow axle motor assembly and associated driven members.

Referring now to FIG. 4, the drive shaft mount 40 is connected to at least one driven member 50. The driven member 50 can be any number of conventional items. For example, the driven member may be a cable and pulley apparatus, a cam, or a shaft. In the embodiment depicted in FIG. 4, there is an intermediate member 52, a drive shaft, between the drive shaft mount 40 and the driven members 50.

Figure 5:
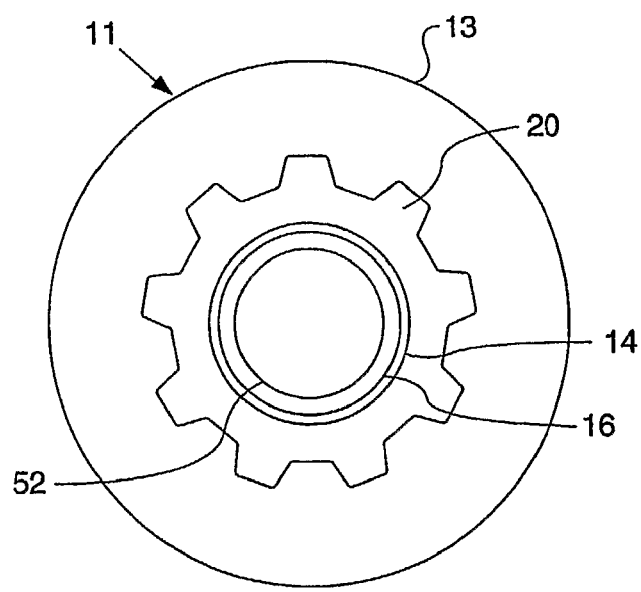
FIG. 5 is an end view of the hollow axle motor assembly.

Referring to FIG. 5, it is seen that the intermediate member 52 is within inner diameter 16. The intermediate member 52 may be the same size, or smaller than, the inner diameter 16. For example, the intermediate member 52 may be smaller than the inner diameter 16 to allow for lubrication.

Figure 6:
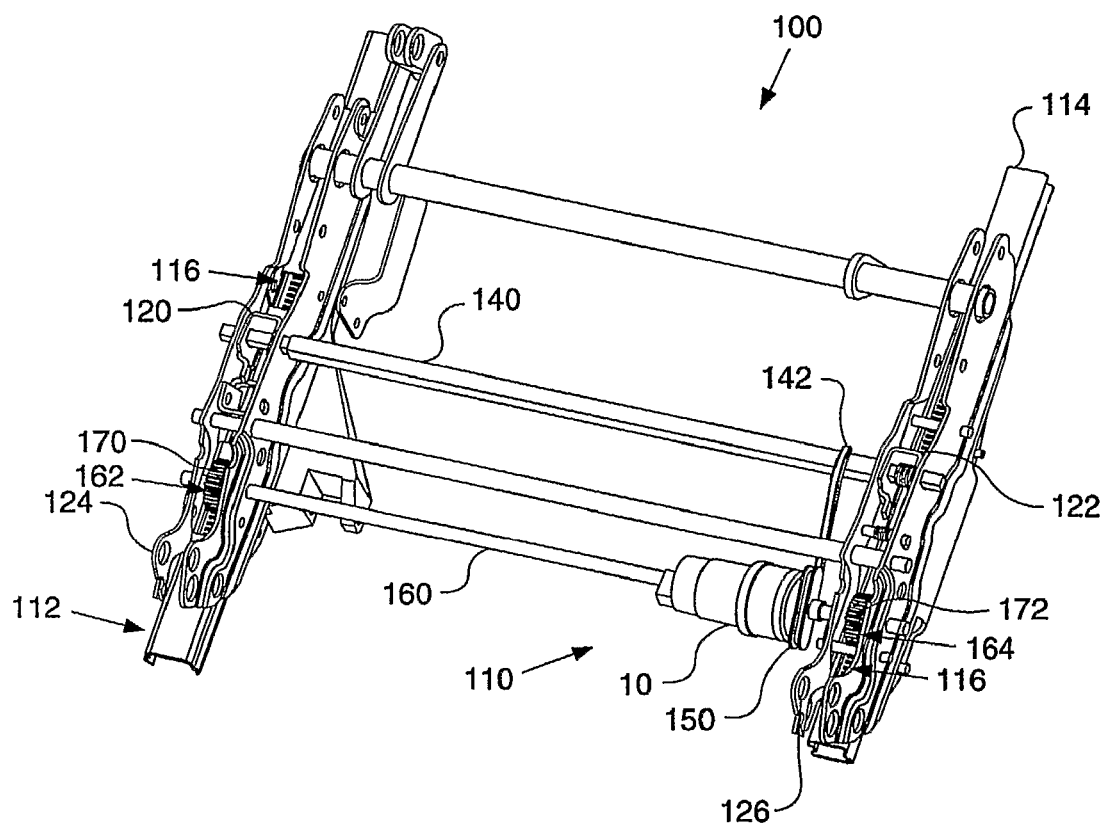
FIG. 6 is a perspective view of a seat track assembly.

A first example of how the hollow axle motor assembly 10 may be used is illustrated in FIG. 6. In FIG. 6, there is a seat track assembly 100. The seat track assembly 100 includes a track drive mechanism 110. The track drive mechanism 110 includes a first track 112 and a second track 114. The second track 114 is offset from the first track 112. Each track 112, 114 includes a rack portion 116. A first locking mechanism 120 positively engages the first track 112 when the first locking mechanism 120 is in a "locked" position. A second locking mechanism 122 positively engages the second track 114 when the second locking mechanism 122 is in a "locked" position.

A first extruded slider 124 slidably connects to the first track 112. A second extruded slider 126 slidably connects to the second track 114. A seat (best seen in FIG. 11) is mounted on the first and second extruded sliders 124, 126. The seat can only move forward or backward on the extruded sliders 124, 126 when the locking mechanisms 120, 122 are disengaged. In a crash, the locking mechanisms 120, 122 help hold the extruded sliders, and thus the seat, to the tracks 112, 114.

The first locking mechanism 120 and the second locking mechanism 122 each include at least one pivotable locking member. In the embodiment depicted in FIGS. 8, 9, and 10, the locking mechanisms 120, 122 each include a first pivotable locking member 130 and a second pivotable locking member 132. The pivotable locking members 130, 132 are spring-biased to engage the rack portion 116. The first pivotable locking member 130 includes a first arm 134. The second pivotable locking member 132 includes a second arm 136.

A latch release shaft 140 connects the first locking mechanism 120 and the second locking mechanism 122. The latch release shaft 140 rotates to move the locking mechanisms 120, 122 from a "locked" position to an "unlocked" position, or vice versa. A latch bar 142 is connected to the latch release shaft 140. For example, the latch bar 142 may be welded or fastened to the latch release shaft 140.

The latch bar 142 engages a cam 150. The cam 150 is connected to the hollow axle motor assembly 10. In the depicted embodiments, the cam 150 is connected to the housing 22, or, as those skilled in the art will understand, the cam 150 may be integrally incorporated into the housing 22. It is within the scope of the present invention that other linkage assemblies between the housing 22 and the latch release shaft 140 may be used.

Figure 7:
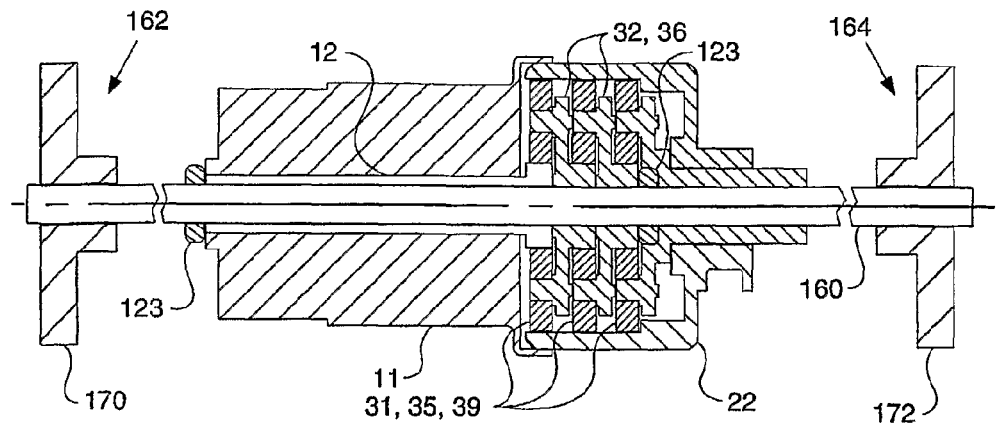
FIG. 7 is a sectional top view of the hollow axle motor assembly.

As best seen in FIG. 7, a track drive shaft 160 is connected to the hollow axle motor assembly 10. The track drive shaft 160 includes an upper portion 162 and a lower portion 164. A first track drive gear 170 is connected to the upper portion 162. A second track drive gear 172 is connected to the lower portion 164. In the depicted embodiments, track drive gears 170, 172 are spur gears. However, those skilled in the art will understand that other types of gears may be used. The first track drive gear 170 engages the first track 112. The second track gear 172 engages the second track 114. While the hollow axle motor assembly 10 is depicted in FIG. 6, those skilled in the art will understand that a conventional motor assembly having a dual output could also be used.

In operation, the hollow axle motor assembly 10 is actuated. For example, the hollow axle motor assembly 10 may be actuated by engaging a switch (not shown). Once the hollow axle motor assembly 10 is actuated, the torque of the motor rotates the housing 22 and the cam 150 in a first direction. The cam 150 engages the latch bar 142 such that the latch bar 142 causes the release shaft 140 to rotate, thereby releasing the first and second locking mechanisms 120, 122. In other words, the hollow axle motor assembly automatically places the locking mechanisms in an "unlocked" position prior to moving the seat along the first and second tracks 112,114. Once the locking mechanisms 120, 122 are released, the locking mechanisms 120, 122 prevent further rotation of the release shaft 140 by acting as a stop. In turn, the release shaft 140 reacts against the latch bar 142. Thus, the latch bar 142 prevents further rotation of the housing 22 and the cam 150. As an example, the housing may rotate five to twenty degrees before the locking mechanisms 120, 122 are released. Thereafter, the motor 11 acts upon the track drive shaft 160. The track drive shaft 160 rotates thereby adjusting the position of the first and second extruder sliders 124, 126 so that the position of the seat is adjusted.

When the first and second extruder sliders 124, 126 are adjusted to the desired position, the hollow axle motor assembly is disengaged. Thereafter, a spring force provided by the assembly of the latch bar 142 and the locking mechanisms 120,122 cause the latch bar 142 to act upon the cam 150 such that the housing 22 and the cam 150 rotate in a direction opposite to the first direction. After the cam 150 and the housing 22 rotate slightly, the latch bar 142 rotates the latch release shaft 140 such that the locking mechanisms 120, 122 are engaged. In other words, the locking mechanisms 120,122 are automatically placed in a "locked" position after the extruded sliders 124, 126 are adjusted.

Figure 8:
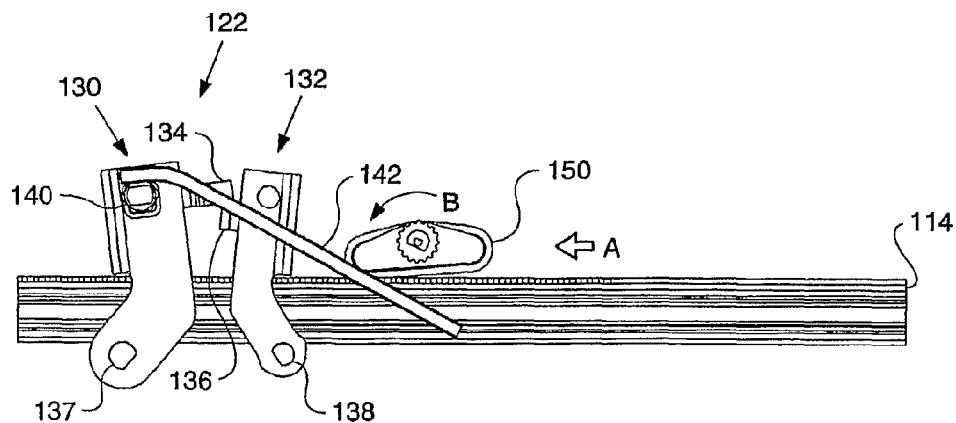
FIG. 8 is a sectional side view illustrating a forward cam position.

FIG. 8 illustrates a forward cam position for moving the seat in a first direction. In the example illustrated in FIG. 8, it is desired to adjust the seat relative to the first track 112 and the second track 114 in the direction of Arrow A. In this example, the cam 150 rotates in the direction of Arrow B and engages the latch bar 142. The latch bar 142 causes the latch release shaft 140 to rotate thereby generating a torque on the first pivotable locking member 130. Then, the first pivotable locking member 130 pivots about a first axle 137. The pivotal movement of the first pivotable locking member 130 causes the first arm 134 to engage the second arm 136. The movement of the second arm 136 causes the second pivotable locking member 132 to rotate about a second axle 138. The first and second pivotable locking members 130, 132 pivot until the rack portion 116 is no longer engaged. This releases the first locking mechanism 120 and the second locking mechanism 122 and allows the first and second extruded sliders 124, 126 to move relative to the first and second tracks 112, 114.

Figure 9:
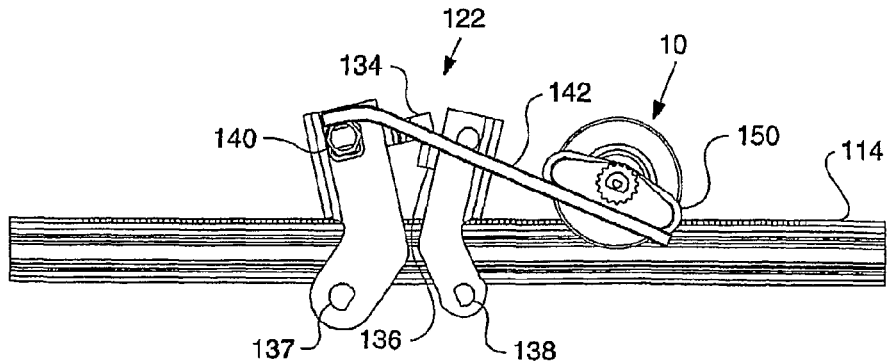
FIG. 9 is a sectional side view illustrating a neutral cam position.

FIG. 9 illustrates a neutral cam position when the seat is stationary. In the example shown in FIG. 9, the first and second locking mechanism 120, 122 are in a "locked" position. In this position, the first and second pivotable locking members 130, 132 are engaged with the rack portion 116, and the cam 150 is in contact or in near contact to the latch bar 142.

Figure 10:
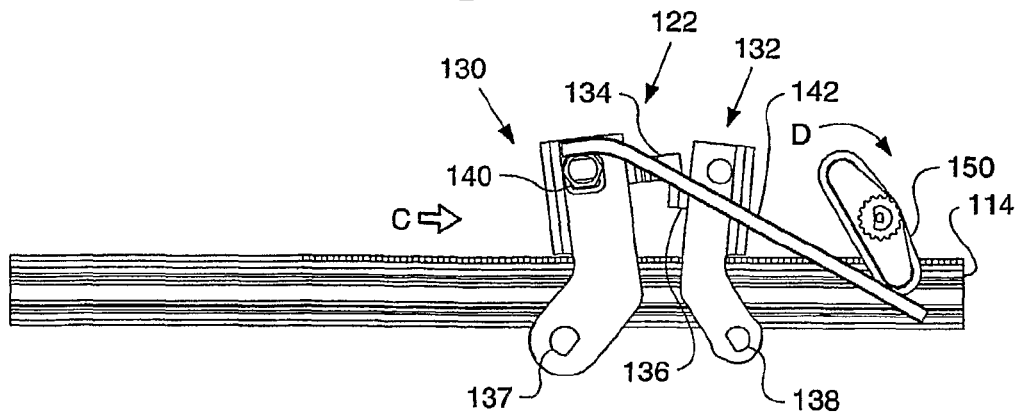
FIG. 10 is a sectional side view illustrating a reverse cam position.

FIG. 10 illustrates a reverse cam position for moving the seat in a direction opposite to the first direction. In the example illustrated in FIG. 10, it is desired to adjust the extruded sliders 124, 126 relative to the first track 112 and the second track 114 in the direction of Arrow C. In this example, the cam 150 rotates in the direction of Arrow D and engages the latch bar 142. The latch bar 142 causes the latch release shaft 140 to rotate thereby generating a torque on the first pivotable locking member 130. Then, the first pivotable locking member 130 pivots about a first axle 137. The pivotal movement of the first pivotable locking member 130 causes the first arm 134 to engage the second arm 136. The movement of the second arm 136 causes the second pivotable locking member 132 to rotate about a second axle 138. The first and second pivotable locking members 130, 132 pivot until the rack portion 116 is no longer engaged. This releases the first locking mechanism 120 and the second locking mechanism 122 and allows the first and second extruded sliders 124, 126 to move relative to the first and second tracks 112, 114.

Figure 11:
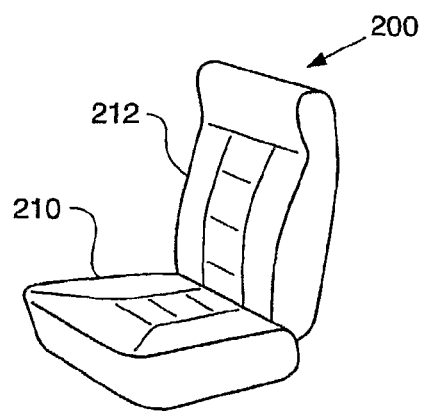
FIG. 11 is a perspective view of a seat.

In a second example, the hollow axle motor assembly 10 is incorporated into a seat hinge. FIG. 11 illustrates a seat 200 having a seat bottom 210 and a seat back 212. The seat bottom 210 and the seat back 212 each include a frame (not shown). The seat back 212 is hingedly connected to the seat bottom 210. In the embodiment depicted in FIG. 12, the hollow axle motor assembly 10 is incorporated into the seat hinge.

Figure 12:
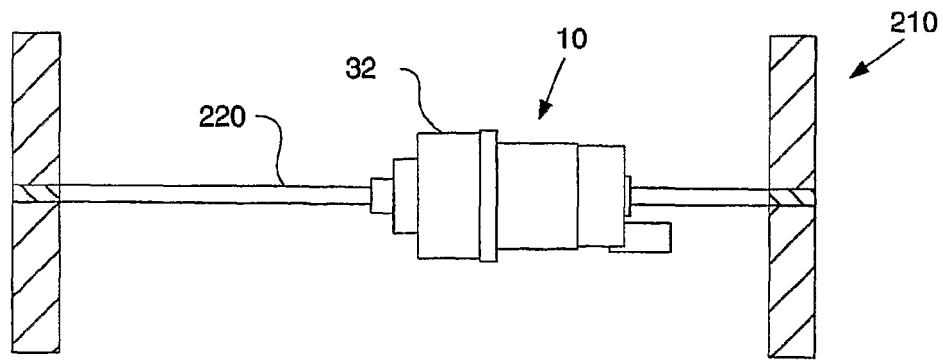
FIG. 12 is a top sectional view of a seat hinge.

FIG. 12 illustrates the hinge arrangement. The hollow axle motor assembly 10 is connected to a shaft 220. The shaft 220 is rigidly connected to the frame of the seat bottom. The housing 22 of the hollow axle motor assembly is rigidly connected to the seat back 212. For example, the housing 22 may be connected to the frame of the seat back 212. Alternatively, the shaft may be attached to the seat back frame and the housing to the seat bottom frame, provided that rotation of hollow motor assembly 10 moves the back and bottom relative to each other.

In operation, the hollow axle motor assembly 10 is engaged. Thereafter, the hollow axle motor 10 rotates the housing 22. In turn, the housing 22 moves the seat back 212 to the desired inclination.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, while a 3-stage planetary gear reduction is shown, those skilled in the art will understand that a greater or lesser number of stages may be used. Thus, the breadth and scope of the present invention should not be limited by any of the above-described exemplary embodiments, but should be defined only in accordance with the following claims appended hereto and their equivalents.

What is claimed is:

1. A track drive mechanism, characterized by:
    a first track (112);
    a second track (114) offset from said first track (112);
    a first locking mechanism (120) adapted to engage said first track (112);
    a second locking mechanism (122) adapted to engage said second track (114);
    a latch release shaft (140) operatively connected to said first locking mechanism (120) and to said second locking mechanism (122);
    a latch bar (142) operatively connected to said latch release shaft (140);
    a hollow axle motor assembly (10) having a hollow axle (12) and a housing (22);
    a track drive shaft (160) operatively connected to said hollow axle (12), said track drive shaft (160) having an upper portion (162) and a lower portion (164);
    a first gear (170) adapted to engage said first track (112) and operatively connected to said upper portion (162) of said track drive shaft (160);
    a second gear (172) adapted to engage said second track (114) and operatively connected to said lower portion (164) of said track drive shaft (160); and
    a cam (150) operatively connected to said housing (22), said cam (150) adapted to engage said latch bar (142) such that, upon engagement of said hollow axle motor assembly (10) and rotation of said cam (150), said latch bar (142) rotates said latch release shaft (140) thereby releasing said first locking mechanism (120) and said second locking mechanism (122).

2. The track drive mechanism according to claim 1, wherein each of said first track (112) and said second track (114) include a rack portion (116).

3. The track drive mechanism according to claim 1, wherein said first locking mechanism (120) includes a first pivotable locking member (130), said second locking mechanism (122) includes a second pivotable locking member (132), said first pivotable locking member (130) is spring-biased to engage said first track, and said said second pivotable locking member (130) is spring-biased to engage said second track.

4. The track drive mechanism according to claim 1, further characterized by a first extruded slider (124) slidably connected to said first track (112) and a second extruded slider (126) slidably connected to said second track (114).

5. The track drive mechanism according to claim 1, wherein said hollow axle motor assembly (10) includes:
    an electric motor (11) having an armature (13), said armature (13) adapted to drive said hollow axle (12), said hollow axle (12) having an outer diameter (14) and an inner diameter (16), said hollow axle (12) adapted to receive said track drive shaft (160) within said inner diameter (16);
    a first gear (20) operatively connected to said hollow axle (12);
    a planetary gear drive assembly (30) in driven communication with said first gear (20);
    and
    a drive shaft mount (40) in driven communication with said planetary gear drive assembly (30) and in driving communication with said track drive shaft (160), wherein said hollow axle (12) rotates said first gear (20), said first gear (20) engages said planetary gear drive assembly (30), said planetary gear drive assembly (30) rotates said drive shaft mount (40), and said drive shaft mount (40) rotates said track drive shaft (160) within said hollow axle (12).

* * * * *